United States Patent
Yu et al.

(10) Patent No.: US 8,559,566 B2
(45) Date of Patent: Oct. 15, 2013

(54) METHOD AND APPARATUS FOR DECOMPOSING RECEIVED SYMBOL SIGNAL MODULATED WITH BIT REFLECTED GRAY CODE IN BIT INFORMATION

(75) Inventors: Chang Wahn Yu, Daejeon (KR); Dong Weon Yoon, Seoul (KR); Kwang Min Hyun, Seoul (KR); Youn Ok Park, Daejeon (KR); Dae Ho Kim, Daejeon (KR); Jun-Woo Kim, Daejeon (KR); Hyeong Sook Park, Daejeon (KR); Seung Jae Bahng, Daejeon (KR); Young Jo Bang, Daejeon (KR); Kyung Yeol Sohn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 464 days.

(21) Appl. No.: 12/734,984

(22) PCT Filed: Sep. 1, 2008

(86) PCT No.: PCT/KR2008/005129
§ 371 (c)(1),
(2), (4) Date: Jan. 12, 2011

(87) PCT Pub. No.: WO2009/072737
PCT Pub. Date: Jun. 11, 2009

(65) Prior Publication Data
US 2011/0103521 A1    May 5, 2011

(30) Foreign Application Priority Data
Dec. 7, 2007 (KR) ........................ 10-2007-0127019

(51) Int. Cl.
*H04L 27/06* (2006.01)
(52) U.S. Cl.
USPC ............................. 375/340; 375/324; 375/341
(58) Field of Classification Search
USPC .......................................... 375/340, 324, 341
See application file for complete search history.

(56) References Cited

U.S. PATENT DOCUMENTS

| | | | |
|---|---|---|---|
| 2002/0131515 A1 | 9/2002 | Rodriguez | |
| 2002/0136317 A1 | 9/2002 | Oelcer et al. | |
| 2007/0064831 A1 | 3/2007 | Bjerke et al. | |
| 2008/0285685 A1* | 11/2008 | Chang et al. | 375/324 |

FOREIGN PATENT DOCUMENTS

| | | |
|---|---|---|
| KR | 10-2005-0058269 | 6/2005 |
| WO | WO03/049397 A2 | 6/2003 |

OTHER PUBLICATIONS

International Search Report and Written Opinion of International Searching Authority dated Mar. 19, 2009 in relation to International Application No. PCT/KR2008/005129.
Filippo Tosato, et al.: "Simplified Soft-Output Demapper for Binary Interleaved COFDM with Application to HIPERLAN/2", Dipartimento di Elettronica e Informatica, University of Padova, Via Gradenigo 6/a, 35131 Padova, Italy, 6 pgs., Oct. 10, 2001, Hewlett-Packard Company 2001.

* cited by examiner

*Primary Examiner* — Kabir A Timory

(57) ABSTRACT

Disclosed is a method and apparatus for composing a received symbol signal modulated with a bit reflected Gray code into bit information. According to an embodiment of the present invention, a positive integer of the received symbol signal having bits is assigned according to the Gray mapping rule, and a sign is determined. A value that is indicative of an arrangement of the bits constituting the received symbol signal is calculated. A boundary value in at least one bit group consisting of the bits constituting the received symbol signal is acquired, and a difference from an absolute value of the received symbol signal is calculated. The received symbol signal is converted into information per bit using a value of the received symbol signal based on the positive integer and the determined sign, the value that is indicative of the bit arrangement, and the difference from the absolute value. Therefore, it is possible to reduce complexity in bitwise decomposition for an iterative decoder inevitably used in a receiver.

20 Claims, 6 Drawing Sheets

METHOD AND APPARATUS FOR DECOMPOSING RECEIVED SYMBOL SIGNAL MODULATED WITH BIT REFLECTED GRAY CODE IN BIT INFORMATION

CROSS-REFERENCE TO RELATED APPLICATION(S)

The present application is related to International Application No. PCT/KR2008/005129 filed Sep. 1, 2008 entitled "METHOD AND APPARATUS FOR DECOMPOSING RECEIVED SYMBOL SIGNAL MODULATED WITH BIT REFLECTED GRAY CODE INTO BIT INFORMATION" which claims priority to Korean Patent Application No. 10-2007-0127019 filed Dec. 7, 2007. International Application No. PCT/KR2008/005129 is assigned to the assignee of the present application and is hereby incorporated by reference into the present disclosure as if fully set forth herein. The present application hereby claims priority under 35 U.S.C. §119(a) to International Patent Application No. PCT/KR2008/005129 and Korean Patent Application No. 10-2007-0127019.

TECHNICAL FIELD

The present invention relates to a method and apparatus for decomposing a received symbol signal modulated with a bit reflected Gray code (hereinafter referred to as "BRGC") into bit information. Particularly, the present invention relates to a method and apparatus for decomposing symbol values, which are used to apply an iterative decoding scheme to a symbol-mapped QAM (quadrature amplitude modulation) signal and a PAM (pulse amplitude modulation) signal with the BRGC, into bit information based on probabilities.

BACKGROUND ART

In recent years, advancement of channel codes such as turbo codes and low density parity check (hereinafter referred to as "LDPC") codes has occurred, communication can now be performed with a low bit error rate at a low signal-to-noise ratio (SNR). Therefore, in a system for mobile communication or satellite communication, high-data rate and high-quality communication can be performed.

In a communication system that uses higher-order modulation, such as symbol mapping with the BRGC and the turbo codes or the LDPC codes, iterative decoding is applied to a receiver, thereby improving receiving performance.

Therefore, during a receiving operation, as for higher-order modulation signals, received symbol values are subject to bitwise decomposition based on probabilities, and then the results are transmitted to an iterative decoder. When a soft bit metric is generated, bit information that is required by the iterative decoder and indispensably used in the receiver is extracted.

As methods of extracting bit information from higher-order modulation signals, Log-MAP and Max-Log-MAP algorithms have been used.

It is assumed that an M-PAM signal having M received symbols is zd, and an interval between transmitted symbols is constant, and is, for example, 2d. n denotes additive white Gaussian noise, and each transmitted symbol has K=$\log_2$M bits, that is, $b_0, b_1, \ldots, b_{K-1}$.

For example, in the case of a 4-PAM signal, K=2, and in the case of an 8-PAM signal, K=4. Therefore, bits contained in a symbol may be expressed by $b_k$ (where k=0, 1, ..., and K).

Here, $b_k$ may be said to represent the position of the k-th bit. In this case, bitwise composition using received symbol values can be calculated by using the Log-MAP algorithm as represented by Equation 1.

$$\Lambda(b_k) = \ln \sum_{A \in \{s:b_k = +1\}} \exp\left(-\frac{(z-A)^2}{\sigma^2}\right) - \ln \sum_{B \in \{s:b_k = -1\}} \exp\left(-\frac{(z-B)^2}{\sigma^2}\right) \quad \text{(Equation 1)}$$

Here, $b_k$ denotes a k-th bit value of a received signal symbol, z denotes a received signal, A denotes a positive (+) reference signal value, B denotes a negative (−) reference signal value, and (2 denotes a signal received through an AWGN channel.

At this time, as represented by Equation 1, as the number of signal points is increased, it becomes more difficult to implement the operation structure due to an exponential operation, and thus complexity is increased. To solve this problem, the Max-Log-MAP algorithm that approximates Equation 1 is used, as represented by Equation 2.

$$\Lambda(b_k) \approx LLR(b_k) \quad \text{(Equation 2)}$$
$$= \frac{1}{\sigma^2}\left[\min_{B \in \{s:b_k=-1\}} |z-B|^2 - \min_{A \in \{s:b_k=+1\}} |z-A|^2\right]$$
$$= \frac{1}{\sigma^2}\left[\min_{B \in \{s:b_k=-1\}} (B^2 - 2Bz) - \min_{A \in \{s:b_k=+1\}} (A^2 - 2Az)\right]$$

Equation 2 approximates the exponential operation to the Min/Max functions. However, as the number of symbols is increased, to calculate the Max/Min values, many comparison operations are required depending on the number of cases, which causes an increase in implementation complexity.

That is, when Equations 1 and 2 are used, complexity is increased and processing speed becomes low. For this reason, an LUT (look-up table) based method is widely used. In this structure, $\log_2$M LUTs per bit are needed, and each LUT has a memory that takes the number of quantization levels into consideration. This structure is simple and has a fast response time, but it has the following drawbacks.

1. In general, a memory is used, and as the number of symbols is increased and the quantization level becomes higher, the memory amount is increased. 2. If the quantization level is lowered so as to reduce the memory amount, the performance may be deteriorated. 3. The memory is constantly activated, and accordingly current consumption is increased. 4. An area is required to implement the memory. 5. Particularly, in the case of adaptive modulation, a ROM or a ROM/RAM needs to be used, and an LUT value needs to be changed depending on a signal modulation level M to be used.

Meanwhile, in the case of QAM and PAM, a method based on approximated Max-Log-MAP has been suggested and is widely used, as represented by Equation 3.

$$\Lambda(b_k) \approx \begin{cases} -z, & k=1 \\ |\Lambda(b_{k-1})| - d_k, & k>1 \end{cases} \quad \text{(Equation 3)}$$

According to this method, the operation structure is simple. However, since the operation structure is a sequential operation structure in which the previous operation result is used to perform a next stage operation, there is a limitation to increase the operation speed for wideband transmission in a fast operation.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and apparatus that can reduce complexity in composing a signal into bit information to be input to an iterative decoder while a symbol-mapped signal with a bit reflected Gray code is received.

Technical Solution

The present invention has been made in an effort to provide a method and apparatus that can reduce complexity in composing a signal into bit information to be input to an iterative decoder while a symbol-mapped signal with a bit reflected Gray code is received.

An exemplary embodiment of the present invention provides a method of decomposing a received symbol signal into bit information for iterative decoding.

The method includes: calculating a positive integer of the received symbol signal while having bits assigned according to a Gray mapping rule and determining a sign of the received symbol signal; calculating a value that is indicative of a bit arrangement in the received symbol signal; acquiring a boundary value in at least one bit group having the bits and calculating a difference between a value of the received symbol signal and an absolute value; and converting the received symbol signal into information per bit in parallel using the sign value of the received symbol signal, the value being indicative of the bit arrangement, and the difference from the absolute value.

Another embodiment of the present invention provides an apparatus for decomposing a received symbol signal into bit information for iterative decoding.

The apparatus includes: a positive integer converter that calculates a positive integer of the received symbol signal; a sign determinator that determines a sign of the received symbol signal; and an arithmetic unit that converts the received symbol signal into information per bit using a value of the received symbol signal based on the positive integer and the determined sign value, a value that is indicative of a bit arrangement in the received symbol signal, and a coordinate shifting value of at least one bit group constituting the received symbol signal.

Advantageous Effects

According to the embodiments of the present invention, a simple operation structure for complex bitwise decomposition is suggested, and it is effective for signal detection of QAM and PAM signals.

MODE FOR THE INVENTION

Figure 1:
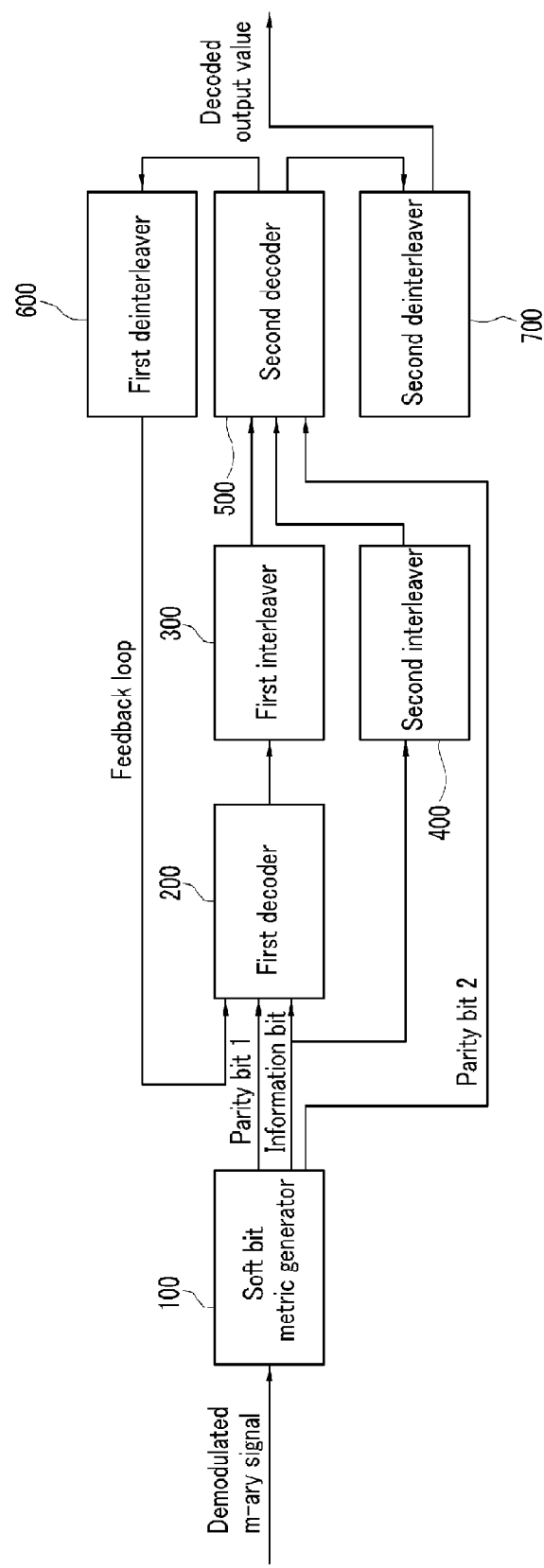
FIG. 1 is a block diagram illustrating a receiving system, which performs bitwise decomposition, according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification, unless explicitly described to the contrary, the word "comprise" and variations such as "comprises" or "comprising" will be understood to imply the inclusion of stated elements but not the exclusion of any other elements. In addition, the terms "-er", "-or", "unit", and "module" described in the specification mean units for processing at least one function and operation, and can be implemented by hardware components or software components and combinations thereof.

A method and apparatus for decomposing a received symbol signal modulated with a bit reflected Gray code into bit information according to an exemplary embodiment of the present invention will now be described in detail with reference to the drawings.

FIG. 1 is a block diagram illustrating the configuration of a receiving system, which performs bitwise decomposition, according to an exemplary embodiment of the present invention.

Referring to FIG. 1, a receiving system includes a soft bit metric generator 100, a first decoder 200, a first interleaver 300, and a second interleaver 400, which are provided at the front stage, and a second decoder 500 that is disposed at the rear stage.

The soft bit metric generator 100 converts a demodulated M-ary (array) I or Q channel symbol signal into information per bit for iterative decoding. Since the QAM or PAM signal in which one symbol is expressed as some bits is transmitted in symbol units, it is evitable that a symbol signal is converted into information in the form of bits for iterative decoding.

The first decoder 200 performs decoding using the bit (parity bit 1, information bit) information output from the soft bit metric generator 100, and outputs the result to the first interleaver 300.

The first interleaver 300 interleaves a value output from the first decoder 200 and outputs the result to the second decoder 500.

The second interleaver 400 interleaves the information bit output from the soft bit metric generator 100 and outputs the result to the second decoder 500.

The second decoder 500 receives the output value from the first interleaver 300, the output value from the second interleaver 400, and a parity bit 2 output from the soft bit metric generator 100, performs decoding, and outputs the result to a first deinterleaver 600 and a second deinterleaver 700.

The first deinterleaver 600 de-interleaves a value output from the second decoder 500 and then performs a feedback loop. That is, the first deinterleaver 600 de-interleaves the input value, and transmits the result to the first decoder 200 for iterative decoding.

The second deinterleaver 700 de-interleaves a value output from the second decoder 500 and outputs a decoded output value.

At this time, the first decoder 200 and the second decoder 500 are constituted from a constituent simple input simple output a posteriori probability decoder.

Hereinafter, the configuration for bitwise decomposition in the soft bit metric generator 100 will be described in detail.

Figure 2:
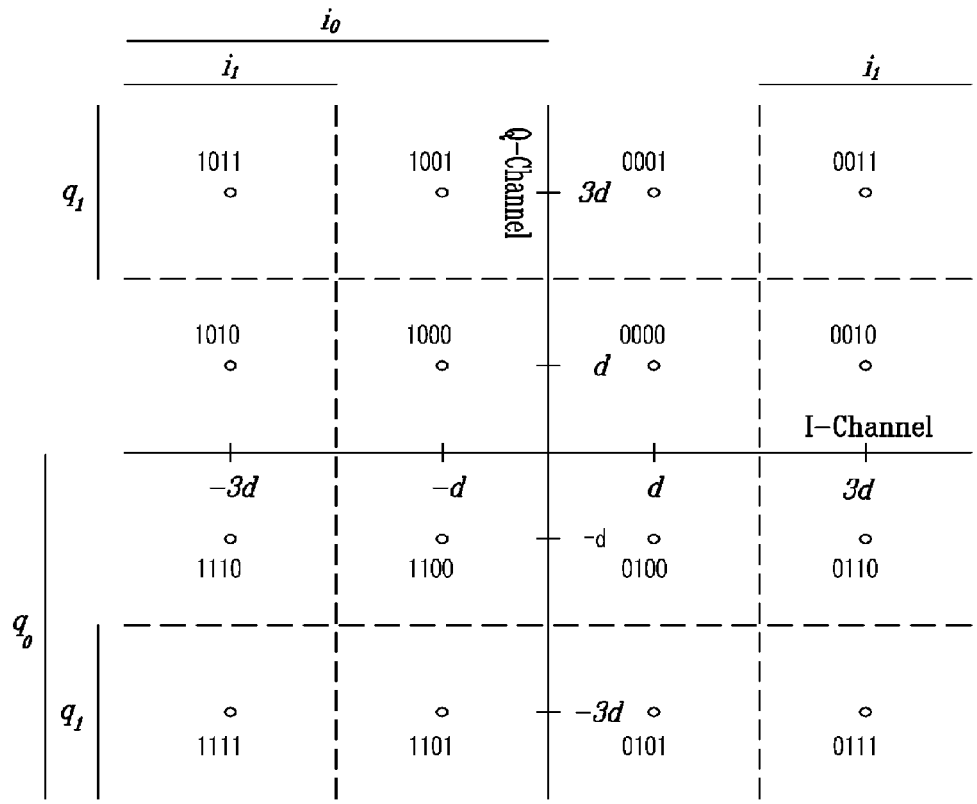
FIG. 2 shows a Gray coded 16-QAM signal constellation according to an exemplary embodiment of the present invention.

FIG. 2 is a Gray coded 16-QAM signal constellation according to an exemplary embodiment of the present invention.

Referring to FIG. 2, a transmitted M-ary QAM signal is configured in a manner in which m (m=$\log_2$M) bits are collected to form a codeword that is constituted of one signal symbol to be transmitted.

At this time, bits constituting a symbol are assigned according to the Gray mapping rule. A Gray coded two-dimensional signal space having M signal points is divided into an I (inphase) channel having N signal points and a Q (quadrature) channel having L signal points. Each channel is a one-dimensional space having the same signal properties. Each channel is a Gray coded PAM (pulse amplitude modulation) signal space. If the numbers of signal points arranged at the I and Q channels are the same, it becomes a square QAM. Otherwise, it becomes a rectangular QAM.

That is, the symbols in the BRGC 16-QAM signal are arranged in an order of $\{I_0, Q_0, I_1, Q_1\}$. One symbol is constituted of 4 bits. The QAM signal is divided into the I and Q channels, and each channel is divided into two PAMs.

In this embodiment, bitwise decomposition of symbol mapped PAM and QAM signals with the BRGC is performed through the analysis of the BRGC characteristics.

FIGS. 3 to 6 show the principle of bitwise decomposition using the BRGC characteristics.

Figure 3:
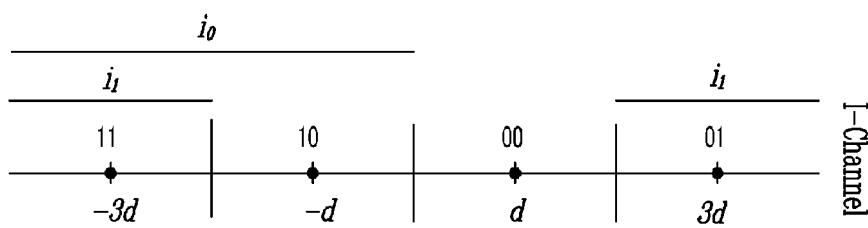
FIG. 3 shows a 4-PAM constellation as a part of FIG. 2.

FIG. 3 shows a 4-PAM constellation as a part of FIG. 2.

As shown in FIG. 3, if corresponding bit information is extracted from two PAM constellations, each being divided into the I and Q channels, 16-QAM bit information is obtained.

On the constellation of FIG. 3, a symbol is divided into groups {1, 0} of the same bit value in each bit position.

The first bit position becomes one group {1x, 1x, 0x, 0x} of the same bit value.

The second bit is constituted of two groups {x1, x0} and {x0, x1} of the same bit value. The two groups have an axisymmetric relationship with respect to the 0 point.

At this time, bit information in the first bit position becomes left/right values with respect to the 0 point.

As for the bit information in the second bit position, the group {x1, x0} becomes left/right values with respect to the 0 point after being coordinate-shifted to the right by 2d, and the group {x0, x1} becomes left/right values with respect to the 0 point after being coordinate-shifted to the left by 2d. The absolute values of the received values are the same, x0, x1. Therefore, the bit information can be calculated in the same manner, regardless of the left and right planes. What is necessary is to take into consideration after calculation is that the sign values in the received values have an axisymmetric relationship.

The bitwise decomposition method using the BRGC characteristics uses the fact that the bits of the signal points arranged on the constellation have an axisymmetric relationship as the BRGC characteristic. Further, the bitwise decomposition method may be defined by a coordinate shifting operation of a bit group.

Figure 4:
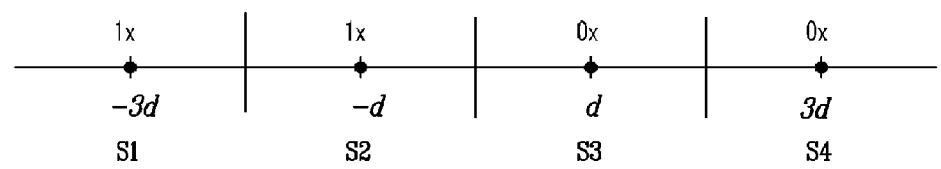
FIG. 4 shows an example of a first bit arrangement among bits constituting a 4-PAM symbol according to an exemplary embodiment of the present invention.

FIG. 4 shows an example of a first bit arrangement among bits constituting a 4-PAM symbol according to an exemplary embodiment of the present invention.

Figure 6:
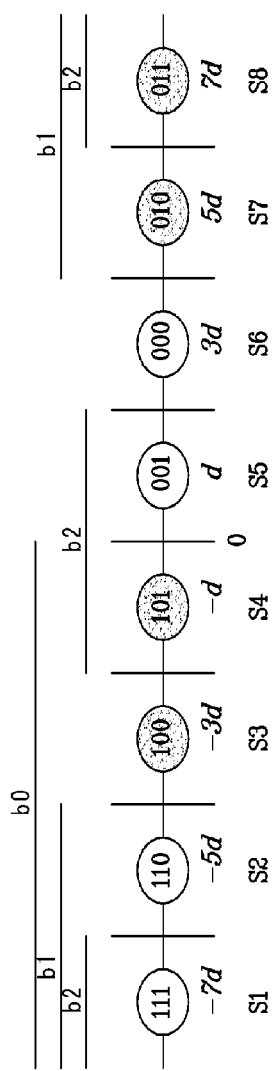
FIG. 6 shows an example of an arrangement of bits constituting an 8-PAM symbol according to an exemplary embodiment of the present invention.

As shown in FIG. 4, when a received symbol value is zd, the first bit value becomes {1x, 1x, 0x, 0x} on the constellation, as shown in FIG. 6, and bit value areas on the left and right planes with respect to the 0 point. In this case, therefore, the bit value can be represented by Equation 4.

$$\Lambda(b_0)=-zd \quad \text{(Equation 4)}$$

Figure 5:
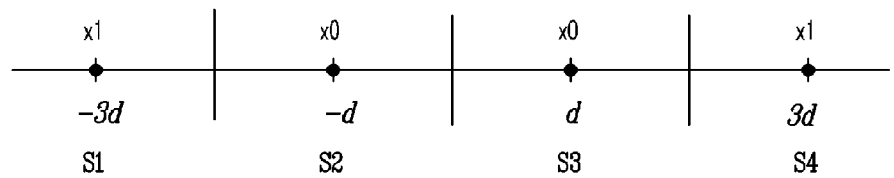
FIG. 5 shows a value of a second bit shown in FIG. 3.

FIG. 5 shows an example of a second bit arrangement among bits constituting a 4-PAM symbol according to an exemplary embodiment of the present invention.

As shown in FIG. 5, the second bit value is $\{x1, x0, x0, x1\}$. This can be divided into $\{x1, x0\}$ and $\{x0, x1\}$. At this time, a bit boundary value of the group $\{x1, x0\}$ is 2. Then, if this group is coordinate-shifted to the right by 2d and Equation 4 is then applied, Equation 5 can be obtained as follows.

$$\Lambda(b_1)=-(2+z)d \quad \text{(Equation 5)}$$

Similarly, if the group $\{x0, x1\}$ is coordinate-shifted to the left by 2d and Equation 4 is applied, Equation 6 can be obtained as follows. At this time, however, it is necessary to take into consideration that the positions of 0 and 1 are opposite to each other.

$$\Lambda(b_1)=-(2-z)d \quad \text{(Equation 6)}$$

Among the values used, d is a constant value, and even if the result value is divided by d, computational generality is not limited. Therefore, d may not be taken into consideration.

Alternatively, since the groups $\{x1, x0\}$ and $\{x0, x1\}$ have an axisymmetric relationship, when the absolute value of the received value zd is acquired, the groups $\{x1, x0\}$ and $\{x0, x1\}$ are the same. Therefore, the two groups can be calculated by one method according to Equation 6, without needing to calculate the two groups separately.

That is, since the absolute value of the received symbol value is |zd|, a value with a coordinate shift to the left by 2d becomes $(2-|z|)d$. When the absolute value is used, if the sign of the received symbol value and the bit arrangement of the signal point are different from each other, the sign of the calculation result may be changed. Therefore, it is necessary to take this case into consideration.

If the received symbol value is S and the value that is indicative of the bit arrangement is $m_k$, the values S and m are one of +1 and −1. As for the received value in the group $\{x1, x0\}$ area, S=−1 and m1=+1, and as for group $\{x0, x1\}$, S=+1 and m1=−1. By using this result, Equation 7 can be obtained as follows.

$$\Lambda(b_1)=S \times m_1 \times (2-|z|)d \quad \text{(Equation 7)}$$

The calculation result by Equation 7 is identical to the calculation results by Equation 5 and Equation 6.

A coordinate shifting value $D_k$ means a boundary value in each bit group. This value can be generally expressed by Equation 8 as follows.

$$\Lambda(b_k)=S \times m_k \times (D_k-|z|)d, k>0 \quad \text{(Equation 8)}$$

In Equation 8, a constant d is a scaling value, and if it is negligible, Equation 9 can be obtained as follows.

$$\Lambda(b_k)=S \times m_k \times (D_k-|z|), k>0 \quad \text{(Equation 9)}$$

FIG. 6 shows an example of an arrangement of bits constituting an 8-PAM symbol according to an exemplary embodiment of the present invention.

By using Equation 9, the decomposition values for the 8-PAM signal shown in FIG. 6 are calculated. The result is shown in Tables 1 and Table 2.

TABLE 1 a) in case of k = 1 (second bit)

| Range | Received value z | Distance D1 | m1 | G | Decomposition value | Bit decision value |
|---|---|---|---|---|---|---|
| z < −6d | −7 | 4 | 1 | −1 | 3 | 1 |
| −6d < z < −4d | −5 | 4 | 1 | −1 | 1 | 1 |
| −4d < z < −2d | −3 | 4 | 1 | −1 | −1 | 0 |
| −2d < z < 0 | −1 | 4 | 1 | −1 | −3 | 0 |
| 0 < z < 2d | 1 | 4 | −1 | 1 | −3 | 0 |
| 2d < z < 4d | 3 | 4 | −1 | 1 | −1 | 0 |
| 4d < z < 6d | 5 | 4 | −1 | 1 | 1 | 1 |
| z > 6d | 7 | 4 | −1 | 1 | 3 | 1 |

TABLE 2 b) in case of k = 2 (third bit)

| Range | Received value z | Distance D2 | m2 | G | Decomposition value | Decision bit value |
|---|---|---|---|---|---|---|
| z < −6d | −7 | 6 | 1 | −1 | 1 | 1 |
| −6d < z < −4d | −5 | 6 | 1 | −1 | −1 | 0 |
| −4d < z < −2d | −3 | 2 | −1 | −1 | −1 | 0 |
| −2d < z < 0 | −1 | 2 | −1 | −1 | 1 | 1 |
| 0 < z < 2d | 1 | 2 | 1 | 1 | 1 | 1 |
| 2d < z < 4d | 3 | 2 | 1 | 1 | −1 | 0 |
| 4d < z < 6d | 5 | 6 | −1 | 1 | −1 | 0 |
| z > 6d | 7 | 6 | −1 | 1 | 1 | 1 |

Among the factors used in Equation 9, S is easily determined by taking the sign of the input value. m and $D_k$ can be obtained by a simple operation with the received real number value z.

Here, z is expressed by (z)10 as a decimal. The real number value is expressed as an integer by using a mathematical function, for example a floor function, and then converted to binary. Then, $(r_0, r_1, \ldots r_{K-1})_2$ is obtained.

At this time, $r_k$ is a binary value of 0 or 1. For example, when the received real number value z=5.3, a value 5 is obtained by the floor function. This value is expressed as $(101)_2$ in binary.

When the coordinate shifting value $D_k$ is calculated on the 8-PAM constellation shown in FIG. 6 to obtain a bitwise decomposition value per bit, no group in a bit $b_0$ layer needs to be shifted on the coordinate axis in order to determine a bit value. In a bit $b_1$ layer, groups {S1, S2, S3, S4} and {S5, S6, S7, S8} need to be shifted by 4 on the coordinate axis. In a bit $b_2$ layer, according to the received symbol values, groups {S1, S2}, and {S7, S8} need to be shifted by 6 on the coordinate axis, and groups {S3, S4} and {S5, S6} need to be shifted by 2. If it is generalized, the coordinate shifting value can be calculated according to the regularity as follows.

$$D_1=2^{(K-1)}$$

$$D_2=\{(r_0)_2 \times 2+1\} \times 2^{(K-2)}$$

$$D_k=\{(r_0 \ldots r_{k-2})_2 \times 2+1\} \times 2^{(K-k)}, k=3, \ldots, K-1 \quad \text{(Equation 10)}$$

When $m_k$ that is indicative of the bit value arrangement in a symbol is calculated, in the case of the bit $b_1$ layer, four symbols on the left side have the same pattern (1, 1, 0, 0), and four symbols on the right side have an axisymmetric relationship (0, 0, 1, 1).

In the bit $b_2$ layer, $G_1$ and $G_3$ have the same pattern (1, 0), and $G_2$ and $G_4$ have an axisymmetric relationship (0, 1). When the groups have the same pattern, +1 is assigned, and when the groups have an axisymmetric relationship, −1 is assigned. Calculating these values, they have the following regularity.

$$m_1=1(-1)$$

$$m_k=r_{k-2}(0 \text{ or } 1), k=2, 3, \ldots, K-1 \quad \text{(Equation 11)}$$

When the received signal is an M-QAM, it can be divided into two PAMs, and they can be calculated independently. That is, the received symbol value of the QAM signal is $z=z_I+jz_Q$, and thus it can be calculated by wise decomposition using $z_I$ and bitwise decomposition using $z_Q$.

Figure 7:
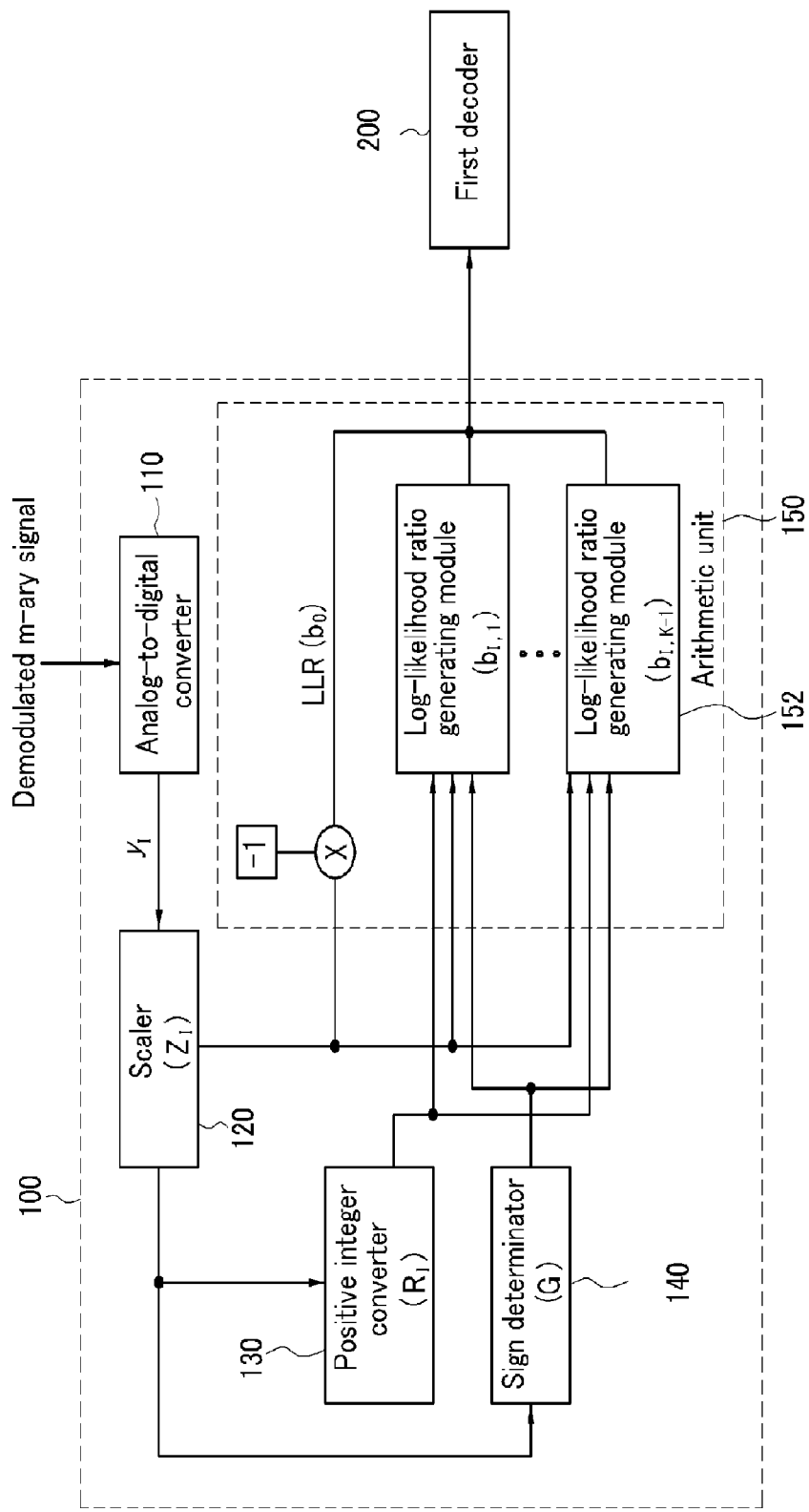
FIG. 7 is a block diagram illustrating the configuration of a soft bit metric generator according to an exemplary embodiment of the present invention.

FIG. 7 is a block diagram illustrating the configuration of a soft bit metric generator according to an exemplary embodiment of the present invention. That is, FIG. 7 shows the configuration for bitwise decomposition using Equation 9.

As shown in FIG. 7, the soft bit metric generator 100 includes an analog-to-digital converter 110, a scaler 120, a positive integer converter 130, a sign determinator 140, and an arithmetic unit 150.

The analog-to-digital converter 110 converts a demodulated m-ary analog symbol signal into a digital symbol signal.

The scaler 120 scales the symbol signal output from the analog-to-digital converter 110 using a reference value that is used for determining a signal point position similar to a reference value for determining a space between symbols, and outputs the result value $Z_I$.

The positive integer converter 130 calculates a positive integer $R_I$ of the symbol signal $Z_I$ output from the scaler 120.

The sign determinator 140 determines and outputs a sign of the symbol signal $Z_I$ output from the scaler 120. In Equation 9, S is determined by taking the sign of the input value determined by the sign determinator 140.

The arithmetic unit 150 performs bitwise decomposition using $Z_I$, $R_I$, and G calculated by the scaler 120, the positive integer converter 130, and the sign determinator 140, and outputs the result values to the first decoder 200. The detailed configuration of the arithmetic unit 150 is as shown in FIG. 8.

Figure 8:
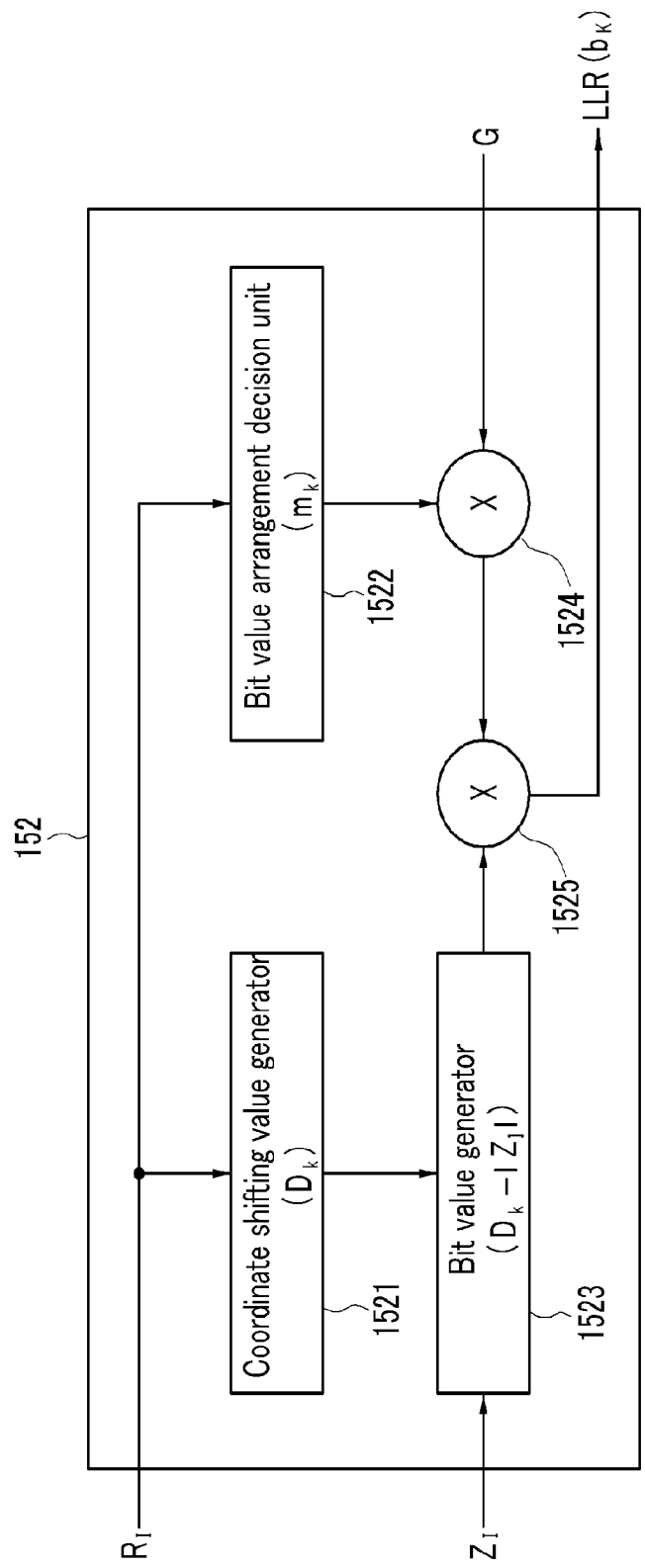
FIG. 8 is a block diagram illustrating a log-likelihood ratio generating module according to an exemplary embodiment of the present invention.

FIG. 8 is a block diagram illustrating the configuration of a log-likelihood ratio generating module according to an exemplary embodiment of the present invention. That is, FIG. 8 shows the configuration of a log-likelihood ratio generating module for k-th bitwise decomposition.

As shown in FIG. 8, a log-likelihood ratio generating module 152 includes a coordinate shifting value generator 1521, a bit value arrangement decision unit 1522, a bit value generator 1523, and bit multipliers 1524 and 1525.

The coordinate shifting value generator 1521 calculates a value $D_k$ for the coordinate axis shift using the positive integer $R_I$ by Equation 10. That is, it determines, using the positive integer $R_I$, a group in the signal space where a received signal is included, and calculates a distance $D_k$ for shifting a bit determining boundary of the group to the origin.

The bit value arrangement decision unit 1522 generates the value $m_k$ that is indicative of the bit arrangement by Equation 11.

The bit value generator 1523 calculates a bit value b using the coordinate shifting value $D_k$ output from the coordinate shifting value generator 1521 and the symbol signal $Z_I$ output from the scaler (120 of FIG. 7).

The bit multiplier 1524 multiples the value $m_k$ that is indicative of the bit arrangement output from the bit value arrangement decision unit 1522 and the sign value G output from the sign determinator 140 in the form of bits.

The bit multiplier 1525 multiplies the values output from the bit value generator 1523 and the bit multiplier 1524, performs sign conversion on the operation result, and generates and outputs log-likelihood ratio (LLR) information.

Figure 9:
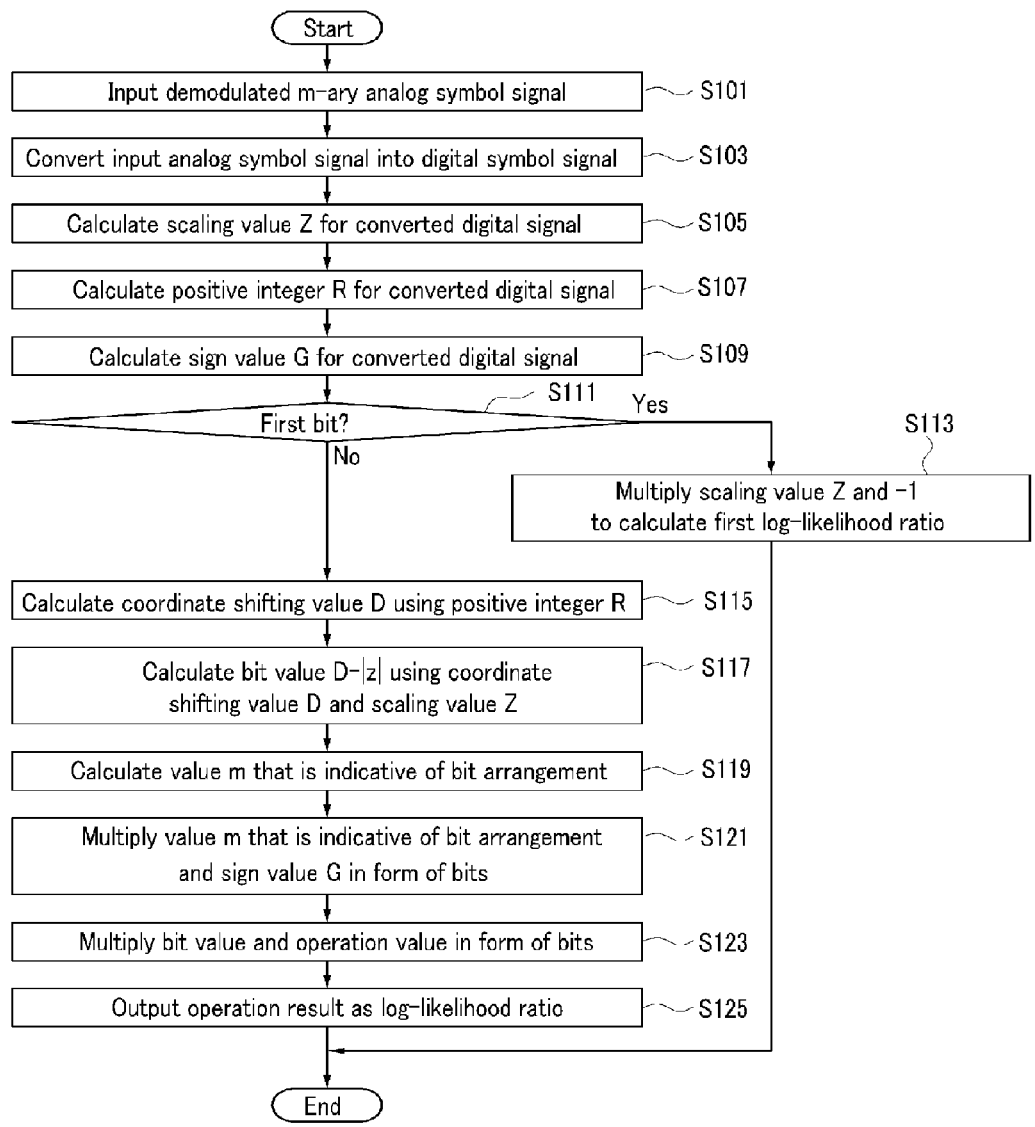
FIG. 9 is a flowchart illustrating a bitwise decomposition method according to an exemplary embodiment of the present invention.

FIG. 9 is a flowchart illustrating a bitwise decomposition method according to an exemplary embodiment of the present invention. The flowchart of FIG. 9 shows a series of steps for bitwise decomposition based on the configuration shown in FIGS. 7 and 8.

As shown in FIG. 9, if a demodulated M-ary analog symbol signal is input (S101), it is converted into a digital symbol signal (S103).

The converted digital symbol signal is scaled (S105) to calculate a positive integer and a sign (S107 and S109).

When a bit of the digital symbol signal is a first bit $b_0$ (S111), for the first bit $b_0$, a first log-likelihood ratio LLR0 is output by multiplication of the scaling value Z and −1 (S113).

Next, for the second to k-th bits, the log-likelihood ratios are calculated in parallel.

That is, the coordinate shifting value D is calculated using the positive integer R (S115).

The bit value b is then calculated using the coordinate shifting value $D_k$ and the scaling value $Z_I$ (S117).

Next, the value $m_k$ that is indicative of the bit arrangement is generated (S119).

Then, the sign value G is multiplied by the value $m_k$ that is indicative of the bit arrangement in the form of bits (S121).

Real number multiplication is then performed on the operation value $S \times m_k$ of the bit value b and the value $m_k$, and the result value $$S \times m \times (D - |z|)$$

is output (S123).

Through steps S115 to S123, the second log-likelihood ratio, ..., and the k-th log-likelihood ratio are calculated (S125).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of decomposing a received symbol signal into bit information for iterative decoding, the method comprising:

calculating, by a positive integer converter, a positive integer of the received symbol signal while having bits assigned according to a Gray mapping rule and determining, by a sign determinator, a sign of the received symbol signal;

calculating a value that is indicative of a bit arrangement in the received symbol signal;

acquiring a boundary value in at least one bit group having the bits and calculating a difference between a value of the received symbol signal and an absolute value; and converting, by an arithmetic unit, the received symbol signal into information per bit in parallel using a value of the received symbol signal taking the sign, the value being indicative of the bit arrangement and the difference from the absolute value.

2. The method of claim 1, wherein calculating the value that is indicative of the arrangement comprises using a value according to whether bit groups constituting the received symbol signal have the same pattern or are axisymmetric on left and right planes with respect to a coordinate axis.

3. The method of claim 2, wherein calculating the difference from the absolute value comprises:

converting the positive integer of the received symbol signal into a binary value;

calculating the boundary value in the bit group for shifting the coordinate axis using the binary value of the received symbol signal per bit; and calculating a difference between the boundary value in the bit group and the absolute value of the received symbol signal.

4. The method of claim 3, wherein converting the received symbol signal into information per bit comprises:

multiplying the sign value of the received symbol signal and the value that is indicative of the bit arrangement; and multiplying the operation value in the multiplying by the difference from the absolute value to calculate a log-likelihood ratio per bit.

5. The method of claim 4, wherein converting the received symbol signal into information per bit further comprises:

for a first bit, multiplying the value of the received symbol signal by "−1" to calculate a first log-likelihood ratio; and for a second bit and subsequent bits, repeating the multiplying to calculate the log-likelihood ratio.

6. An apparatus for decomposing a received symbol signal into bit information for iterative decoding, the apparatus comprising:

a positive integer converter configured to calculate a positive integer of the received symbol signal;

a sign determinator configured to determine a sign of the received symbol signal; and an arithmetic unit configured to convert the received symbol signal into information per bit in parallel using a value of the received symbol signal based on the positive integer and the determined sign, a value that is indicative of a bit arrangement in the received symbol signal, a difference from an absolute value of the received symbol signal, and a coordinate shifting value of at least one bit group constituting the received symbol signal.

7. The apparatus of claim 6, wherein the arithmetic unit comprises a plurality of log-likelihood ratio generating modules that are coupled in parallel to multiply the sign value of the received symbol signal, the value being indicative of the bit arrangement, and the coordinate shifting value in at least one bit group, and the difference from the absolute value of the received symbol signal, and is further configured to output a log-likelihood ratio per bit.

8. The apparatus of claim 7, wherein each log-likelihood ratio generating module in the arithmetic unit comprises:

a bit value arrangement decision unit configured to calculate the value that is indicative of the bit value arrangement using a value according to whether bit groups constituting the received symbol signal have the same pattern or are axisymmetric on left and right planes with respect to a coordinate axis;

a coordinate shifting value generator configured to convert the positive integer of the received symbol signal into a binary value and calculate a boundary value in the bit group for shifting the coordinate axis using the binary value of the received symbol signal per bit;

a bit value generator configured to calculate a difference between the boundary value in the bit group and the absolute value of the received symbol signal;

a first multiplier configured to multiply the value of the received symbol signal based on the positive integer and the determined sign, and the value that is indicative of the bit arrangement; and a second multiplier configured to multiply the operation value from the first multiplier and a value output from the bit value generator, and output each log-likelihood ratio per bit.

9. The apparatus of claim 8, wherein the arithmetic unit is further configured to multiply, for a first bit, the value of the received symbol signal by "−1" to calculate a first log-likelihood ratio, and multiply, for bits other than the first bit, log-likelihood ratios by using the bit value arrangement decision unit, the bit value generator, the first multiplier, and the second multiplier.

10. The apparatus of claim 6, further comprising an analog-to-digital (AD) converter configured to convert an M-ary (array) demodulated analog symbol signal into a digital symbol signal having m bits, wherein m=log 2M.

11. The apparatus of claim 10, further comprising a scaler configured to scale the digital symbol signal from the AD converter and output the received symbol signal to the positive integer converter.

12. The apparatus of claim 11, wherein the scaler is further configured to scale the digital symbol signal using a reference value this is used for determining a signal point position similar to a reference value for determining a space between symbols.

13. A receiving system configured to perform bitwise decomposition, the receiving system comprising:

a soft bit metric generator configured to convert a demodulated M-ary (array) channel symbol signal into information per bit for iterative decoding using m bits, wherein $m=\log_2 M$, the soft bit metric generator comprising:

a positive integer converter configured to calculate a positive integer;

a positive integer converter configured to calculate a positive integer of the received symbol signal;

a sign determinator configured to determine a sign of the received symbol signal; and an arithmetic unit configured to convert the received symbol signal into information per bit using a value of the received symbol signal based on the positive integer and the determined sign, a value that is indicative of a bit arrangement in the received symbol signal, and a coordinate shifting value of at least one bit group constituting the received symbol signal.

14. The receiving system of claim 13, wherein the arithmetic unit comprises a plurality of log-likelihood ratio generating modules that are coupled in parallel to multiply the sign value of the received symbol signal, the value being indicative of the bit arrangement, and the coordinate shifting value in at least one bit group, and a difference from an absolute value of the received symbol signal, and is further configured to output a log-likelihood ratio per bit.

15. The receiving system of claim 14, wherein each log-likelihood ratio generating module in the arithmetic unit comprises:

a bit value arrangement decision unit configured to calculate the value that is indicative of the bit value arrangement using a value according to whether bit groups constituting the received symbol signal have the same pattern or are axisymmetric on left and right planes with respect to a coordinate axis;

a coordinate shifting value generator configured to convert the positive integer of the received symbol signal into a binary value and calculate a boundary value in the bit group for shifting the coordinate axis using the binary value of the received symbol signal per bit;

a bit value generator configured to calculate a difference between the boundary value in the bit group and the absolute value of the received symbol signal;

a first multiplier configured to multiply the value of the received symbol signal based on the positive integer and the determined sign, and the value that is indicative of the bit arrangement; and a second multiplier configured to multiply the operation value from the first multiplier and a value output from the bit value generator, and output each log-likelihood ratio per bit.

16. The receiving system of claim 15, wherein: the arithmetic unit is further configured to multiply, for a first bit, the value of the received symbol signal by "−1" to calculate a first log-likelihood ratio, and multiply, for bits other than the first bit, log-likelihood ratios by using the bit value arrangement decision unit, the bit value generator, the first multiplier, and the second multiplier.

17. The receiving system of claim 13, further comprising an analog-to-digital (AD) converter configured to convert a demodulated analog symbol signal into a digital symbol signal having m bits.

18. The receiving system of claim 17, further comprising a scaler configured to scale the digital symbol signal from the AD converter and output the received symbol signal to the positive integer converter.

19. The receiving system of claim 18, wherein the scaler is further configured to scale the digital symbol signal using a reference value this is used for determining a signal point position similar to a reference value for determining a space between symbols.

20. The receiving system of claim 13, further comprising:

a first decoder configured to perform decoding based on the bit information output from the soft bit metric generator, a parity bit 1 from the soft bit metric generator, and an output from a first deinterleaver;

a first interleaver configured to interleave an output from the first decoder;

a second interleaver configured to interleave the bit information output from the soft bit metric generator;

a second decoder configured to perform decoding based on an output from the first interleaver, an output from the second interleaver, and a parity bit 2 output from the soft bit metric generator;

a first de-interleaver configured to de-interleave an output from the second decoder; and a second de-interleaver configured to de-interleave the output form the second decoder and output a decoded output value.

* * * * *